US010505590B2

(12) United States Patent
Tenno

(10) Patent No.: US 10,505,590 B2
(45) Date of Patent: Dec. 10, 2019

(54) ANTENNA DEVICE AND ELECTRONIC APPARATUS

(71) Applicant: Murata Manufacturing Co., Ltd., Nagaokakyo-shi, Kyoto-fu (JP)

(72) Inventor: Nobuyuki Tenno, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 17 days.

(21) Appl. No.: 15/925,807

(22) Filed: Mar. 20, 2018

(65) Prior Publication Data

US 2018/0212649 A1 Jul. 26, 2018

Related U.S. Application Data

(63) Continuation of application No. PCT/JP2016/081665, filed on Oct. 26, 2016.

(30) Foreign Application Priority Data

Oct. 27, 2015 (JP) .................................. 2015-210798

(51) Int. Cl.
| | |
|---|---|
| *H01Q 1/38* | (2006.01) |
| *H04B 5/00* | (2006.01) |
| *H01Q 7/00* | (2006.01) |
| *H04B 5/02* | (2006.01) |
| *H01Q 1/06* | (2006.01) |
| *H01Q 1/24* | (2006.01) |

(52) U.S. Cl.
CPC ............. *H04B 5/0081* (2013.01); *H01Q 1/06* (2013.01); *H01Q 1/38* (2013.01); *H01Q 7/00* (2013.01); *H04B 5/02* (2013.01); *H01Q 1/243* (2013.01)

(58) Field of Classification Search
CPC .......... H04B 5/0081; H04B 5/02; H01Q 1/06; H01Q 1/38; H01Q 7/00; H01Q 1/243
See application file for complete search history.

(56) References Cited

U.S. PATENT DOCUMENTS

| | | | |
|---|---|---|---|
| 5,912,622 A | 6/1999 | Endo et al. | |
| 2012/0055998 A1* | 3/2012 | Mieslinger | G06K 19/07749 235/492 |
| 2013/0307746 A1 | 11/2013 | Nakano et al. | |

FOREIGN PATENT DOCUMENTS

| | | |
|---|---|---|
| DE | 197 33 849 A1 | 6/1998 |
| JP | 2007-243468 A | 9/2007 |

(Continued)

OTHER PUBLICATIONS

Official Communication issued in International Patent Application No. PCT/JP2016/081665, dated Jan. 10, 2017.

*Primary Examiner* — Dameon E Levi
*Assistant Examiner* — David E Lotter
(74) *Attorney, Agent, or Firm* — Keating & Bennett, LLP

(57) ABSTRACT

A coil antenna is mounted on a circuit substrate. A wiring pattern is disposed on the circuit substrate and connects the coil antenna and a feed circuit. A conductive pattern is disposed on the circuit substrate and located outside a region surrounded by the coil antenna, feed circuit, and wiring pattern. A conductive pattern is disposed on the circuit substrate and located inside the region surrounded by the coil antenna, feed circuit, and wiring pattern. Connection conductors connect the conductive pattern and conductive pattern and are disposed on the circuit substrate. The connection conductor includes interlayer connection conductors.

20 Claims, 7 Drawing Sheets

(56) References Cited

FOREIGN PATENT DOCUMENTS

| | | |
|---|---|---|
| JP | 2010-271803 A | 12/2010 |
| JP | 2014-075775 A | 4/2014 |
| JP | 2014-211789 A | 11/2014 |

\* cited by examiner

ANTENNA DEVICE AND ELECTRONIC APPARATUS

CROSS REFERENCE TO RELATED APPLICATIONS

This application claims the benefit of priority to Japanese Patent Application No. 2015-210798 filed on Oct. 27, 2015 and is a Continuation Application of PCT Application No. PCT/JP2016/081665 filed on Oct. 26, 2016. The entire contents of each application are hereby incorporated herein by reference.

BACKGROUND OF THE INVENTION

1. Field of the Invention

The present invention relates to an antenna device in a near field communication (NFC) system or other systems and an electronic apparatus including the same.

2. Description of the Related Art

An example of a known antenna device used in the NFC system is described in Japanese Unexamined Patent Application Publication No. 2014-75775. This antenna device includes a feed coil and a planar conductor. The feed coil is connected to a radio frequency integrated circuit (RFIC). The planar conductor has a slit extending from a portion of its outer edge toward its inner area. The feed coil is arranged on a principal surface of the planar conductor such that a coil opening surfaces the slit. When a coil antenna that performs communications with the antenna device (coil antenna of a communication partner) approaches the planar conductor, the planar conductor functions as a radiation plate, and the feed coil is magnetically coupled to the coil antenna of the communication partner with the planar conductor interposed therebetween.

Various mobile electronic apparatuses and other equipment need to be more compact and thinner. One approach to attempt to achieve this end is to form the planar conductor and a wiring pattern connecting the feed coil and the RFIC on the same layer. In this case, it is necessary to have a gap for isolating the planar conductor and the wiring pattern. Unfortunately, however, some magnetic flux expands in unnecessary directions through the gap, and the proportion of magnetic flux contributing to the magnetic coupling between the feed coil and the coil antenna of the communication partner decreases. This leads to weakening of the magnetic coupling between the feed coil and the coil antenna of the communication partner.

SUMMARY OF THE INVENTION

Preferred embodiments of the present invention provide antenna devices that achieve size and thickness reduction and that are capable of being strongly magnetically coupled to an antenna of a communication partner, and provide electronic apparatuses including the same.

An antenna device according to a preferred embodiment of the present invention includes a circuit substrate, a feed circuit, a coil antenna, a wiring pattern, a planar first conductive pattern, a planar second conductive pattern, and a connection conductor. The coil antenna is mounted on the circuit substrate. The wiring pattern is disposed on the circuit substrate and connects the coil antenna and the feed circuit. The first conductive pattern is disposed on the circuit substrate and located outside a loop current path defined by the coil antenna, the feed circuit, and the wiring pattern when the circuit substrate is seen in plan view. The second conductive pattern is disposed on the circuit substrate and positioned inside the loop current path when the circuit substrate is seen in plan view. The connection conductor or the wiring pattern connects the first conductive pattern and the second conductive pattern in at least two locations and is disposed on the circuit substrate. At least one location of the connection conductor includes an interlayer connection conductor.

With this configuration, if magnetic flux expands and leaks through the gap between the wiring pattern and the first and second conductive patterns, an eddy current flows in the closed loop defined by the first and second conductive patterns and the connection conductor. The passage of the eddy current causes the occurrence of magnetic flux that cancels the magnetic flux expanding through the gap between the wiring pattern and the first and second conductive patterns. Thus, magnetic flux that does not contribute to magnetic coupling between the coil antenna and a coil antenna of a communication partner is weakened, and the coefficient of coupling between the coil antenna and the coil antenna of the communication partner is increased.

The coil antenna may preferably include a first coil opening near an outer edge of the first conductive pattern and a second coil opening positioned inside the outer edge of the first conductive pattern. With this configuration, magnetic flux entering and exiting from the first coil opening of the coil antenna expands outside the outer edge of the first conductive pattern, and magnetic flux entering and exiting from the second coil opening of the coil antenna does not pass through the opening in the first conductive pattern. Accordingly, the coil antenna and first conductive pattern effectively operate using radiation.

The connection conductor may preferably include a planar third conductive pattern disposed on the circuit substrate so as to overlap the coil antenna when the connection conductor is seen in plan view and continuously connecting the first conductive pattern and the second conductive pattern. With this configuration, the structure of the connection conductor is able to be simplified.

The connection conductor may preferably include a fourth conductive pattern overlapping a portion of the wiring pattern disposed on the circuit substrate of the wiring pattern such that they are isolated from each other and continuously connecting the first conductive pattern and the second conductive pattern. With this configuration, the structure of the connection conductor is able to be simplified.

The feed circuit may preferably be provided on the circuit substrate. With this configuration, the antenna device is able to be more compact and thinner.

Each of the first conductive pattern and the second conductive pattern may preferably be a ground conductor. With this configuration, it is not necessary to include a particular planar conductor that extends in a plane.

An electronic apparatus according to a preferred embodiment of the present invention includes an antenna device and a casing. The antenna device includes a circuit substrate, a feed circuit, a coil antenna, a wiring pattern, a planar first conductive pattern, a planar second conductive pattern, and a connection conductor. The coil antenna is mounted on the circuit substrate. The wiring pattern is disposed on the circuit substrate and connects the coil antenna and the feed circuit. The first conductive pattern is disposed on the circuit substrate and located outside a loop current path defined by the coil antenna, the feed circuit, and the wiring pattern when the circuit substrate is seen in plan view. The second conductive pattern is disposed on the circuit substrate and located inside the loop current path when the circuit substrate is seen in plan view. The connection conductor or the wiring pattern connects the first conductive pattern and the second conductive pattern in at least two locations and is disposed on the circuit substrate. At least one location of the connection conductor includes an interlayer connection conductor. With this configuration, the electronic apparatus achieving the above-described advantageous effects is obtained.

According to preferred embodiments of the present invention, antenna devices and electronic apparatuses including the same are able to achieve reductions in size and thickness and have an increased coefficient of coupling between the coil antennas thereof and a coil antenna of a communication partner.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
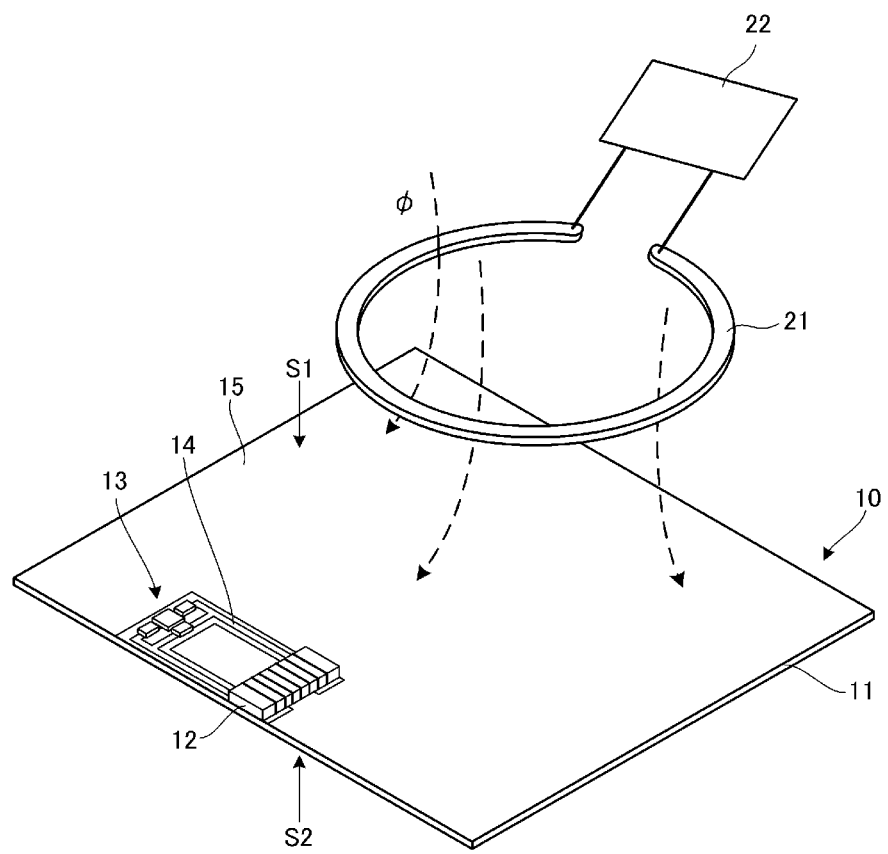
FIG. 1 is a perspective view of an antenna device and a coil antenna of a communication partner according to a first preferred embodiment of the present invention.

Preferred embodiments of the present invention are described below by using specific examples with reference to drawings. The same reference numerals are used in the same areas in the drawings. In consideration of the explanation of main points or the facilitation of understanding, the preferred embodiments are separately illustrated for the sake of convenience. The configurations illustrated in different preferred embodiments may be replaced or combined in part. The description of items in the second and subsequent preferred embodiments common to the first preferred embodiment is omitted, and only different points are described. In particular, substantially the same operational advantages obtained from substantially the same configurations are not described in detail for each preferred embodiment.

First Preferred Embodiment

Figure 2:
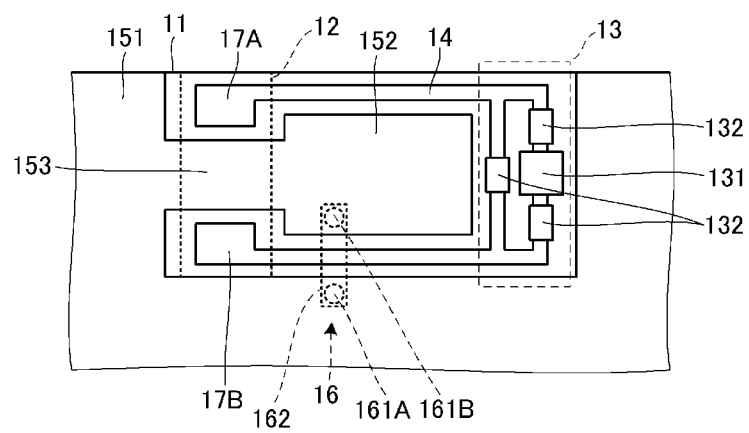
FIG. 2 is a plan view of a main portion of the antenna device according to the first preferred embodiment of the present invention.
Figure 3:
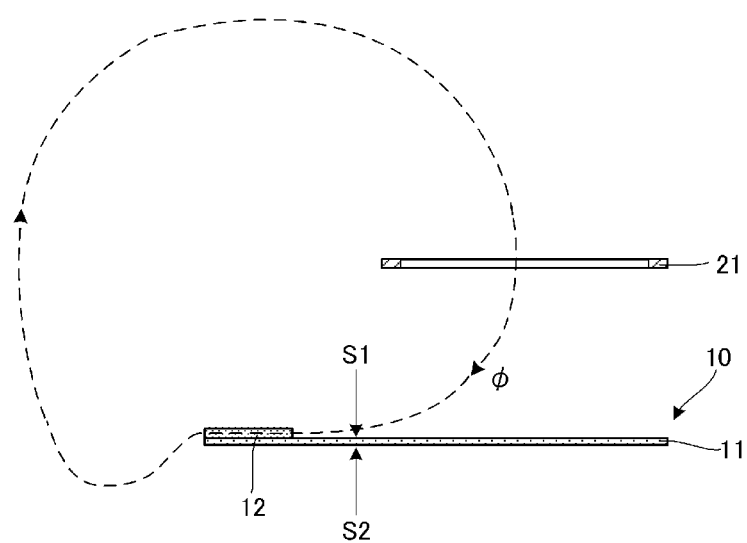
FIG. 3 is a cross-sectional view that illustrates a portion of magnetic flux produced by the coil antenna of the communication partner.
Figure 4:
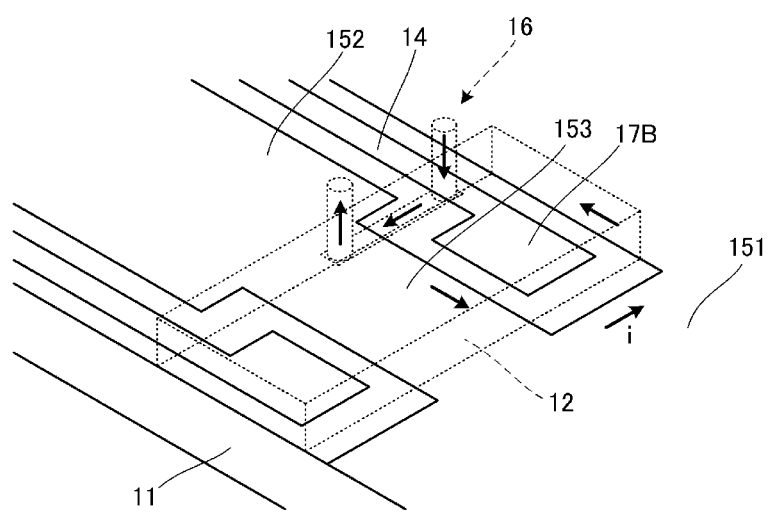
FIG. 4 is a perspective view that illustrates an eddy current generated by magnetic flux expanding through a gap between a wiring pattern 14 and conductive patterns 151 and 152.

FIG. 1 is a perspective view of an antenna device and a coil antenna of a communication partner according to a first preferred embodiment. FIG. 2 is a plan view of a main portion of the antenna device according to the first preferred embodiment. FIG. 3 is a cross-sectional view that illustrates a portion of magnetic flux produced by the coil antenna of the communication partner. FIG. 4 is a perspective view that illustrates an eddy current generated by magnetic flux expanding through a gap between a wiring pattern 14 and conductive patterns 151 and 152. The directions of magnetic flux illustrated in FIGS. 1 and 3 indicate the ones when a current flows in a predetermined direction in the coil antenna of the communication partner.

An antenna device 10 includes a circuit substrate 11, a coil antenna 12, a feed circuit 13, the wiring pattern 14, a conductive pattern 15, and a connection conductor 16. The coil antenna 12 is mounted on a first principal surface S1 of the circuit substrate 11. The feed circuit 13 is provided on the first principal surface S1 of the circuit substrate 11. The wiring pattern 14 is provided on the first principal surface S1 of the circuit substrate 11 and connects the coil antenna 12 and the feed circuit 13. The conductive pattern 15 is provided on all or substantially all of the first principal surface S1 of the circuit substrate 11. The conductive pattern 15 is a ground conductor. Thus, it is not necessary to provide a particular conductor that extends in a plane.

The conductive pattern 15 includes the planar first conductive pattern 151, a planar second conductive pattern 152, and a planar third conductive pattern 153. The first conductive pattern 151 is disposed on the first principal surface S1 of the circuit substrate 11 and positioned outside a region surrounded by the coil antenna 12, feed circuit 13, and wiring pattern 14. The second conductive pattern 152 is disposed on the first principal surface S1 of the circuit substrate 11 and positioned inside the region surrounded by the coil antenna 12, feed circuit 13, and wiring pattern 14. The connection conductor 16 and third conductive pattern 153 connect the first conductive pattern 151 and second conductive pattern 152. The third conductive pattern 153 is a "connection conductor".

The coil antenna 12 is arranged on the outer edge of the circuit substrate 11 (outer edge of the conductive pattern 15). A coil opening of the coil antenna 12 is near an end surface of the circuit substrate 11. The winding axis of the coil antenna 12 faces a direction parallel or substantially parallel to the first principal surface S1 of the circuit substrate 11. The winding axis of the coil antenna 12 faces a direction orthogonal or substantially orthogonal to a direction extending along the outer edge of the circuit substrate 11 in the location in which the coil antenna 12 is arranged. The opening surface of the coil antenna 12 is parallel or substantially parallel to the direction extending along the outer edge of the circuit substrate 11. The opening surface of the coil antenna 12 is parallel or substantially parallel to the end surface of the circuit substrate 11 in the location in which the coil antenna 12 is arranged. The coil antenna 12 is mounted on the circuit substrate 11 such that it is connected to terminal electrodes (not illustrated) of the coil antenna 12 in antenna lands 17A and 17B defined by a pattern integral and continuous with the wiring pattern 14.

The coil antenna 12 includes a magnetic core including a magnetic material and a coil-shaped conductor wound around the magnetic core. The coil-shaped conductor may be, for example, a lead wound around the magnetic core (wire-wound conductor) or may be a conductive pattern provided on a multilayer body in which a plurality of dielectric layers are laminated, a multilayer body in which a plurality of magnetic layers are laminated, or a multilayer body in which one and more dielectric layers or one or more magnetic layers are laminated. The coil antenna 12 may preferably be a chip-shaped antenna including a multilayer body in which a plurality of magnetic layers (e.g., ferrite ceramic layers) are laminated and a coil-shaped conductor including an in-plane conductive pattern and an interlayer conductive pattern provided thereon. With this configuration, the coil antenna is small and surface-mountable.

The feed circuit 13 includes a first end connected to a first end of the coil-shaped conductor of the coil antenna 12 by the wiring pattern 14. The feed circuit 13 includes a second end connected to a second end of the coil-shaped conductor of the coil antenna 12 by the wiring pattern 14. The feed circuit 13 includes an RFIC 131 and chip components 132 defining a matching circuit. The RFIC 131 is connected to the coil antenna 12 with the matching circuit defined by the chip components 132 interposed therebetween. Examples of the RFIC 131 may preferably include an RFIC chip for NFC and a semiconductor IC chip capable of processing high-frequency signals in the HF band for NFC. Examples of the chip components 132 may preferably include a chip inductor and a chip capacitor.

A gap isolating the wiring pattern 14 and conductive pattern 15 is provided between the wiring pattern 14 and conductive pattern 15. In other words, no conductive pattern is provided between the wiring pattern 14 and conductive pattern 15, and the surface of the circuit substrate 11 is exposed. A portion of the wiring pattern 14 is located between the first conductive pattern 151 and second conductive pattern 152 when seen in plan view (seen from the direction perpendicular or substantially perpendicular to the first principal surface S1 of the circuit substrate 11).

The first conductive pattern 151 is disposed on all or substantially all of the first principal surface S1 of the circuit substrate 11. The first conductive pattern 151 surrounds the second conductive pattern 152 when seen in plan view. The first conductive pattern 151 and second conductive pattern 152 are connected to each other in two locations by the connection conductor 16 and third conductive pattern 153. The conductive patterns 151, 152, and 153 and the connection conductor 16 define a closed loop defined by the conductors. The connection conductor 16 and third conductive pattern 153 are in the vicinity of the antenna lands 17A and 17B. The third conductive pattern 153 is preferably a planar conductive pattern and disposed on the first principal surface S1 of the circuit substrate 11 so as to overlap the coil antenna 12 when seen in plan view. The third conductive pattern 153 is located between the circuit substrate 11 and coil antenna 12. That is, when the principal surface of the circuit substrate 11 is seen in plan view, the coil antenna 12 and third conductive pattern 153 at least partially overlap each other. The third conductive pattern 153 is a pattern integral and continuous with the first conductive pattern 151 and second conductive pattern 152.

The connection conductor 16 includes interlayer connection conductors 161A and 161B and a linear conductive pattern 162. The conductive pattern 162 is disposed on a second principal surface S2 opposite to the first principal surface S1 of the circuit substrate 11. The conductive pattern 162 extends from an edge of the first conductive pattern 151 to an edge of the second conductive pattern 152 when seen in plan view. The conductive pattern 162 extends in a direction orthogonal or substantially orthogonal to the direction in which the wiring pattern 14 extends in the location in which the conductive pattern 162 is provided.

The interlayer connection conductor 161A is disposed on the edge of the first conductive pattern 151 when seen in plan view. The interlayer connection conductor 161A overlaps the first end of the conductive pattern 162 when seen in plan view. The interlayer connection conductor 161A connects the first conductive pattern 151 and conductive pattern 162. The interlayer connection conductor 161B is disposed on the edge of the second conductive pattern 152 when seen in plan view. The interlayer connection conductor 161B overlaps the second end of the conductive pattern 162 when seen in plan view. The interlayer connection conductor 161B connects the second conductive pattern 152 and conductive pattern 162.

A coil antenna 21 of a communication partner is connected to an RFIC 22. In the state in which the coil opening surface of the coil antenna 21 is parallel or substantially parallel with the first principal surface S1 of the circuit substrate 11, when the coil antenna 21 is close to the first principal surface S1 of the circuit substrate 11, magnetic flux $\phi$ produced by the coil antenna 21 causes an eddy current to occur in the conductive pattern 15. Because of this, the magnetic flux $\phi$ is prevented from passing through the conductive pattern 15. Thus, the magnetic flux $\phi$ has a direction parallel or substantially parallel with the first principal surface S1 of the circuit substrate 11 in the vicinity of the first principal surface S1 of the circuit substrate 11 and expands substantially radially from the coil antenna 21 when seen in plan view. The magnetic flux $\phi$ is stronger in the outer edge of the circuit substrate 11 than in the central portion of the circuit substrate 11 in the vicinity of the first principal surface S1 of the circuit substrate 11. Because the coil antenna 12 is located on the outer edge of the circuit substrate 11 and the opening surface of the coil antenna 12 is parallel or substantially parallel with the end surface of the circuit substrate 11, the coil antenna 12 is strongly magnetically coupled to the coil antenna 21 of the communication partner.

In the first preferred embodiment, as illustrated in FIG. 4, when magnetic flux expands and leaks through the gap between the wiring pattern 14 and conductive patterns 151 and 152, an eddy current i flows in the closed loop defined by the conductive patterns 151, 152, and 153 and connection conductor 16. Thus, the magnetic flux expanding through the gap between the wiring pattern 14 and conductive patterns 151 and 152 is reduced or prevented. Therefore, the magnetic flux that does not contribute to the magnetic coupling between the coil antenna 12 and the coil antenna 21 of the communication partner is weakened, and the coefficient of coupling between the coil antenna 12 and coil antenna 21 of the communication partner is increased. In the first preferred embodiment, in particular, because the eddy current flows around the antenna land 17B, the magnetic flux expanding through the gap around the antenna land 17B is effectively reduced or prevented.

Second Preferred Embodiment

Figure 5:
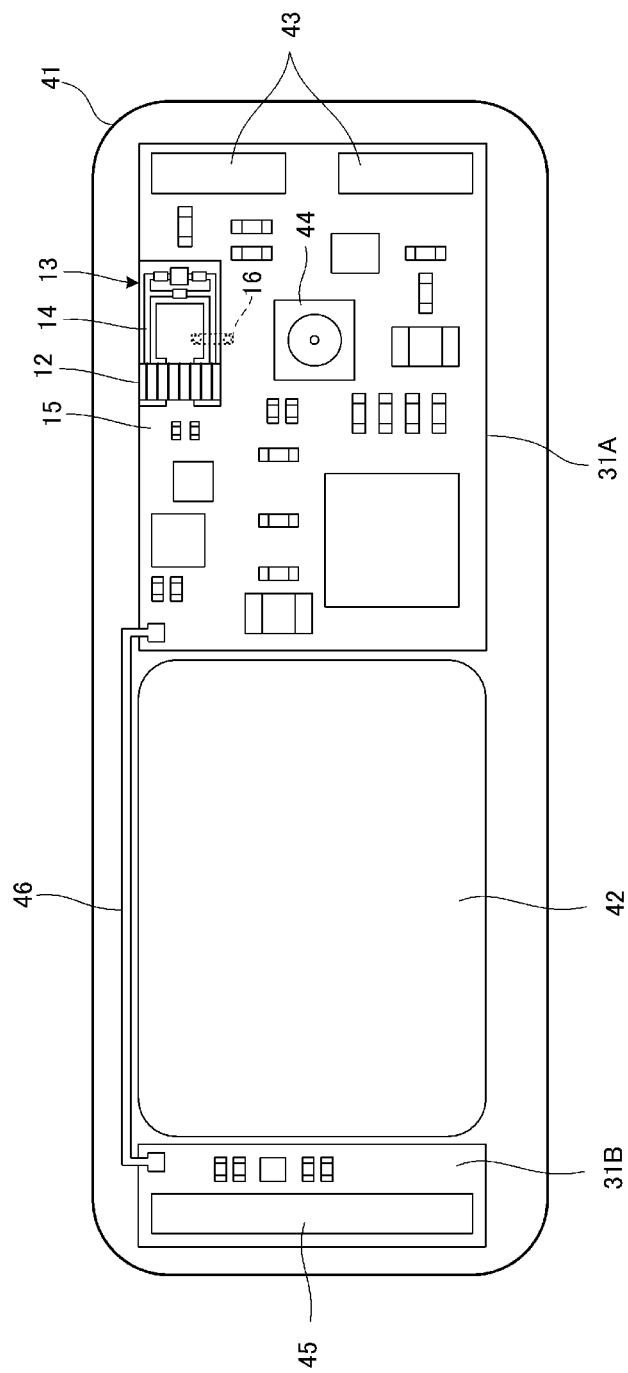
FIG. 5 is a plan view that illustrates a structure inside a casing of an electronic apparatus including an antenna device according to a second preferred embodiment of the present invention.

An electronic apparatus according to a second preferred embodiment of the present invention includes a casing and an antenna device arranged inside the casing. FIG. 5 is a plan view that illustrates a structure inside the casing of the electronic apparatus including the antenna device according to the second preferred embodiment. The electronic apparatus is preferably a communication terminal apparatus, such as a smartphone, for example. A casing 41 houses circuit substrates 31A and 31B, a battery pack 42, and other elements. The coil antenna 12 and feed circuit 13 are provided on the circuit substrate 31A. That is, the wiring pattern 14, the conductive pattern 15, and the connection conductor 16 are provided on the circuit substrate 31A. The antenna device having the same or substantially the same configuration as in the first preferred embodiment is arranged inside the casing 41. The circuit substrate 31A is provided with an ultrahigh frequency (UHF) antenna 43, a camera module 44, and other elements. The circuit substrate 31B is provided with a UHF antenna 45 and other elements. The circuit substrates 31A and 31B are connected to each other with a cable 46 interposed therebetween.

The present preferred embodiment is described using a smartphone as one example of the electronic apparatus. The present preferred embodiment is also applicable to, for example, a cellular phone, such as a feature phone, a personal digital assistant (PDA), a wearable terminal, such as a smart glasses or a smart watch, a notebook personal computer (PC), a tablet terminal, a camera, a game machine, a toy, and an information storage medium, such as a secure digital (SD) card or a subscriber identity module (SIM) card.

Third Preferred Embodiment

Figure 6A:
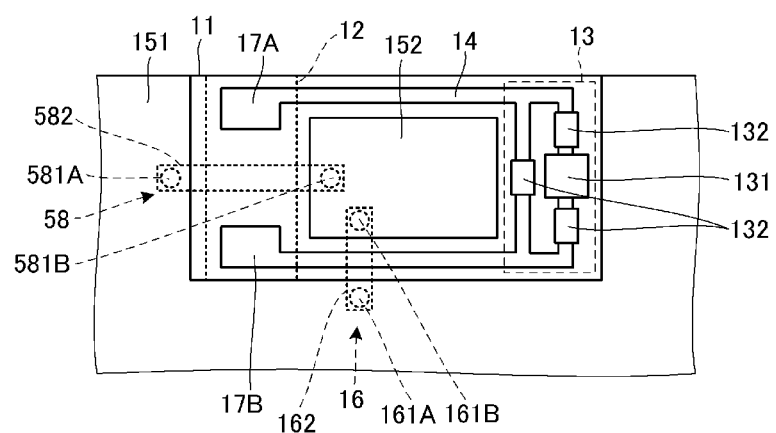
FIG. 6A is a plan view of a main portion of an antenna device according to a first example of a third preferred embodiment of the present invention.

In a first example of a third preferred embodiment of the present invention, the first conductive pattern and second conductive pattern are connected to each other only by connection conductors including interlayer connection conductors. FIG. 6A is a plan view of a main portion of an antenna device according to the first example of the third preferred embodiment. The first conductive pattern 151 and second conductive pattern 152 are connected to each other in two locations by the connection conductor 16 and a connection conductor 58. The connection conductor 58 is disposed on the circuit substrate 11 so as to overlap the coil antenna 12 when seen in plan view.

The connection conductor 58 includes interlayer connection conductors 581A and 581B and a linear conductive pattern 582. The conductive pattern 582 is disposed on the second principal surface of the circuit substrate 11. The interlayer connection conductor 581A overlaps the conductive patterns 151 and 582 when seen in plan view and connects the first conductive pattern 151 and conductive pattern 582. The interlayer connection conductor 581B overlaps the conductive patterns 152 and 582 when seen in plan view and connects the second conductive pattern 152 and conductive pattern 582.

Figure 6B:
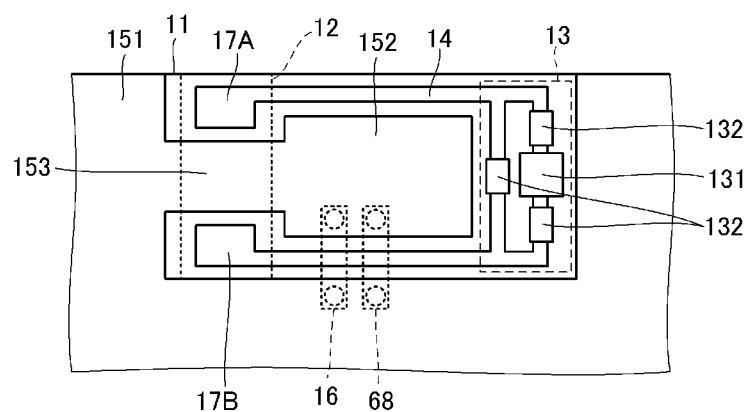
FIG. 6B is a plan view of a main portion of an antenna device according to a second example of the third preferred embodiment of the present invention.

In a second example of the third preferred embodiment, the first conductive pattern and second conductive pattern are connected to each other in more than two locations. FIG. 6B is a plan view of a main portion of an antenna device according to the second example of the third preferred embodiment. The first conductive pattern 151 and second conductive pattern 152 are connected to each other in three locations by the third conductive pattern 153 and connection conductors 16 and 68. The connection conductor 68 has the same or substantially the same configuration as that of the connection conductor 16. The connection conductor 68 and connection conductor 16 are located side by side. In the second example of the third preferred embodiment, as compared to the first preferred embodiment, the first conductive pattern 151 and second conductive pattern 152 are connected to each other in a larger number of locations, and more closed loops pass through the conductive patterns 151 and 152. Accordingly, expansion of magnetic flux in unnecessary directions is effectively reduced or prevented.

Fourth Preferred Embodiment

Figure 7:
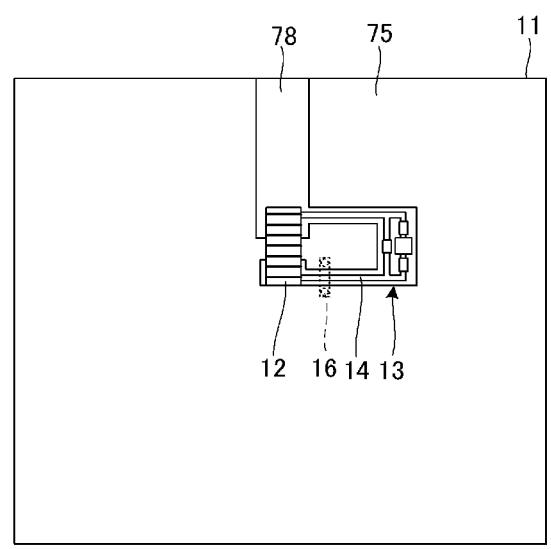
FIG. 7 is a plan view of an antenna device according to a first example of a fourth preferred embodiment of the present invention.

In a first example of a fourth preferred embodiment of the present invention, the coil antenna is provided in an inner area of the circuit substrate when seen in plan view. A conductive pattern disposed on all or substantially all of the first principal surface of the circuit substrate includes a slit that is a portion in which no conductor is provided and extending from the outer edge of the circuit substrate to the opening of the coil antenna. FIG. 7 is a plan view of an antenna device according to the first example of the fourth preferred embodiment. A conductive pattern 75 disposed on all or substantially all of the first principal surface of the circuit substrate 11 includes a slit 78 extending from the outer edge of the circuit substrate 11 (outer edge of the conductive pattern 75) to the opening of the coil antenna 12. The winding axis of the coil antenna 12 extends in a direction parallel or substantially parallel with the direction in which the slit 78 extends. In the first example of the fourth preferred embodiment, in which the coil antenna 12 is provided in a portion other than the end surface of the circuit substrate 11 when seen in plan view, because the coil antenna 12 is arranged on the edge of the conductive pattern 75, the coil antenna 12 is able to be strongly magnetically coupled to the coil antenna of the communication partner.

Figure 8A:
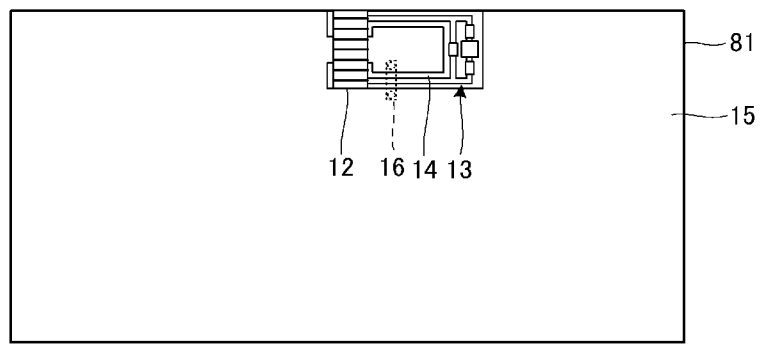
FIGS. 8A to 8C are plan views that illustrate antenna devices according to second to fourth examples of the fourth preferred embodiment of the present invention, respectively.
Figure 8B:
Figure 8C:
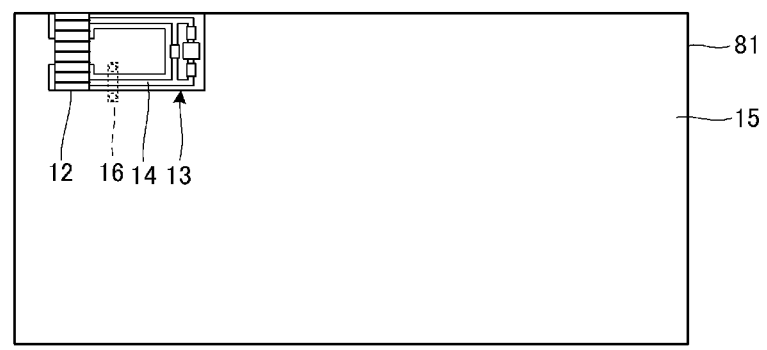

In second to fourth examples of the fourth preferred embodiment, the coil antenna is provided at different locations of the outer edge of the circuit substrate when seen in plan view. FIGS. 8A to 8C are plan views that illustrate antenna devices according to the second to fourth examples of the fourth preferred embodiment, respectively. A circuit substrate 81 preferably has a rectangular or substantially rectangular shape when seen in plan view. In the second example of the fourth preferred embodiment, the coil antenna 12 is provided in the vicinity of a longer side of the circuit substrate 11 and in a central portion in the direction of the longer side of the circuit substrate 11 when seen in plan view. In the third example of the fourth preferred embodiment, the coil antenna 12 is provided in the vicinity of a shorter side of the circuit substrate 11 and in a central portion in the direction of the shorter side of the circuit substrate 11 when seen in plan view. In the fourth example of the fourth preferred embodiment, the coil antenna 12 is provided in a corner of the circuit substrate 11 when seen in plan view. In all of the examples of the fourth preferred embodiment, expansion of magnetic flux in unnecessary directions is effectively reduced or prevented.

Fifth Preferred Embodiment

In a fifth preferred embodiment of the present invention, an example of an antenna device including a fourth conductive pattern continuously connecting the first conductive pattern and second conductive pattern is illustrated.

Figure 9A:
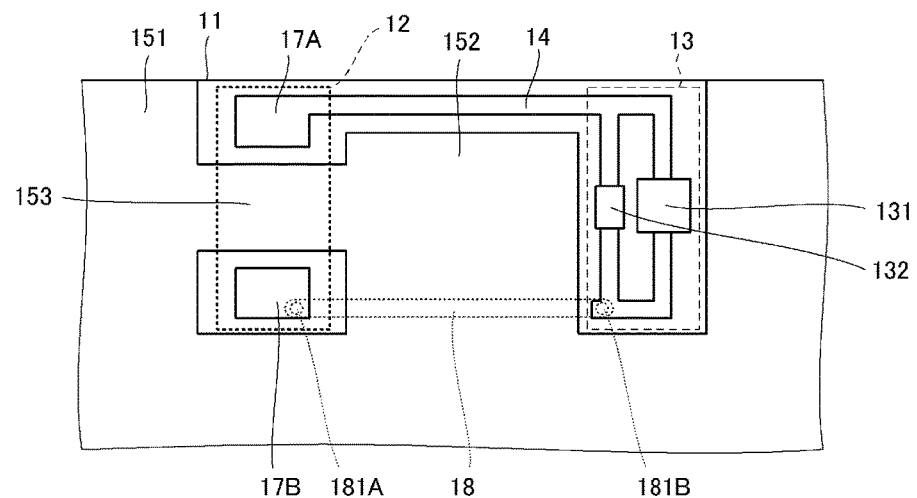
FIG. 9A is a plan view of a main portion of an antenna device according to a fifth preferred embodiment of the present invention.
Figure 9B:
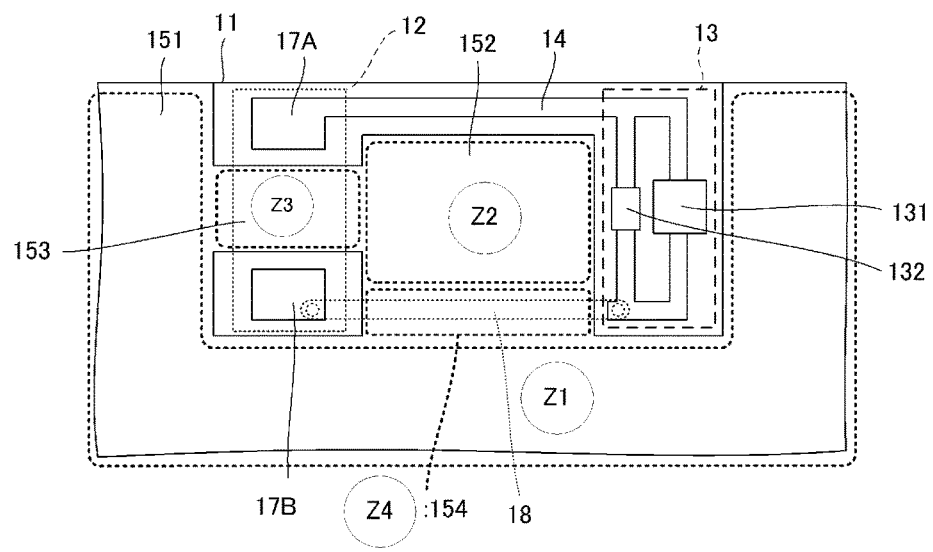
FIG. 9B is a plan view that illustrates example regions for conductive patterns in this antenna device.

FIG. 9A is a plan view of a main portion of the antenna device according to the fifth preferred embodiment. FIG. 9B is a plan view that illustrates example regions for conductive patterns in this antenna device. The coil antenna 12 is indicated by broken lines. The coil antenna 12 preferably has the configuration illustrated in the first preferred embodiment.

The antenna device includes the circuit substrate 11, coil antenna 12, feed circuit 13, antenna lands 17A and 17B, wiring patterns 14 and 18, and planar conductive patterns. The coil antenna 12 is mounted on the first principal surface (surface illustrated in FIGS. 9A and 9B) of the circuit substrate 11. The feed circuit 13 is provided on the first principal surface of the circuit substrate 11. The wiring pattern 14 is disposed on the first principal surface of the circuit substrate 11 and connects the coil antenna 12 and feed circuit 13. The conductive pattern is disposed on an inner layer or second principal surface (surface opposite to the first principal surface) of the circuit substrate 11 and connects the coil antenna 12 and feed circuit 13.

The feed circuit 13 includes a first end connected to a first end of the coil-shaped conductor of the coil antenna 12 with the wiring pattern 14 and antenna land 17A interposed therebetween. The feed circuit 13 includes a second end connected to a second end of the coil-shaped conductor of the coil antenna 12 with an interlayer connection conductor 181B, conductive pattern 18, interlayer connection conductor 181A, and antenna land 17B interposed therebetween. The feed circuit 13 includes the RFIC 131 and the chip component 132 defining the matching circuit. The RFIC 131 is connected to the coil antenna 12 with the matching circuit defined by the chip component 132 interposed therebetween. The RFIC 131 and chip component 132 preferably have the configuration illustrated in the first preferred embodiment.

In the antenna device according to the present preferred embodiment, the planar first conductive pattern 151 is disposed on the first principal surface of the circuit substrate 11 outside a loop current path defined by the coil antenna 12, feed circuit 13, and wiring patterns 14 and 18 when the circuit substrate 11 is seen in plan view. The planar second conductive pattern 152 located inside the above-described loop current path is disposed on the first principal surface of the circuit substrate 11 when the circuit substrate 11 is seen in plan view. The third conductive pattern 153 continuously connecting the first conductive pattern 151 and second conductive pattern 152 is provided. Furthermore, a planar fourth conductive pattern 154 (see FIG. 9B) continuously connecting the first conductive pattern 151 and second conductive pattern 152 is provided. The fourth conductive pattern 154 and conductive pattern 18 are opposed to each other with the circuit substrate 11 interposed therebetween. That is, the fourth conductive pattern 154 overlaps a portion of the conductive pattern 18 disposed on the circuit substrate 11 such that they are isolated from each other.

The above-described third conductive pattern 153 and fourth conductive pattern 154 correspond to a "connection conductor".

In FIG. 9B, a region Z1 indicates a region for the first conductive pattern 151, a region Z2 indicates a region for the second conductive pattern 152, a region Z3 indicates a region for the third conductive pattern 153, and a region Z4 indicates a region for the fourth conductive pattern 154. Because the antenna land 17B is surrounded by the first conductive pattern 151, third conductive pattern 153, second conductive pattern 152, and fourth conductive pattern 154, magnetic flux expanding through the gap around the antenna land 17B is effectively reduced or prevented.

In the preferred embodiments of the present invention, antenna devices and electronic apparatuses in communication systems using primarily magnetic coupling, such as NFC, are described. The antenna devices and electronic apparatuses of the preferred embodiments of the present invention may also be used in a noncontact power transfer system using magnetic coupling (e.g., electromagnetic induction type or magnetic resonance type). That is, the antenna devices of the preferred embodiments of the present invention are applicable as power transmission antenna devices, or power reception antenna devices in power transmission apparatuses, or power reception apparatuses in noncontact power transfer systems.

The feed circuits of the preferred embodiments of the present invention indicate at least one of a circuit that supplies signals (power) to a coil antenna and a circuit that receives signals (power) from a coil antenna.

Each of the wiring patterns and conductive patterns disposed on the circuit substrates in the preferred embodiments of the present invention may be disposed not only on a principal surface (front side or back side) of the circuit substrate but also inside the circuit substrate.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. An antenna device comprising:
a circuit substrate;
a feed circuit;
a coil antenna mounted on the circuit substrate;
a wiring pattern disposed on the circuit substrate and connecting the coil antenna and the feed circuit;
a planar first conductive pattern disposed on the circuit substrate and located outside a loop current path defined by the coil antenna, the feed circuit, and the wiring pattern when the circuit substrate is seen in plan view;
a planar second conductive pattern disposed on the circuit substrate and located inside the loop current path when the circuit substrate is seen in plan view; and
a connection conductor connecting the planar first conductive pattern and the planar second conductive pattern and disposed on the circuit substrate; wherein
at least one location of the connection conductor or the wiring pattern includes an interlayer connection conductor; and
the coil antenna includes a first coil opening adjacent to an outer edge of the planar first conductive pattern and a second coil opening located inside the outer edge of the planar first conductive pattern.

2. The antenna device according to claim 1, wherein the connection conductor includes a planar third conductive pattern disposed on the circuit substrate so as to overlap the coil antenna when the connection conductor is seen in plan view, and connecting the planar first conductive pattern and the planar second conductive pattern.

3. The antenna device according to claim 1, wherein the connection conductor includes a fourth conductive pattern overlapping a portion of the wiring pattern disposed on the circuit substrate of the wiring pattern such that the fourth conductive pattern and the portion of the wiring pattern are isolated from each other, and connecting the planar first conductive pattern and the planar second conductive pattern.

4. The antenna device according to claim 1, wherein the feed circuit is provided on the circuit substrate.

5. The antenna device according to claim 1, wherein each of the planar first conductive pattern and the planar second conductive pattern is a ground conductor.

6. An antenna device comprising:
a circuit substrate;
a feed circuit;
a coil antenna mounted on the circuit substrate;
a wiring pattern disposed on the circuit substrate and connecting the coil antenna and the feed circuit;
a planar first conductive pattern disposed on the circuit substrate and located outside a loop current path defined by the coil antenna, the feed circuit, and the wiring pattern when the circuit substrate is seen in plan view;
a planar second conductive pattern disposed on the circuit substrate and located inside the loop current path when the circuit substrate is seen in plan view; and
a connection conductor connecting the planar first conductive pattern and the planar second conductive pattern and disposed on the circuit substrate; wherein
at least one location of the connection conductor or the wiring pattern includes an interlayer connection conductor; and
the connection conductor includes a planar third conductive pattern disposed on the circuit substrate so as to overlap the coil antenna when the connection conductor is seen in plan view, and connecting the planar first conductive pattern and the planar second conductive pattern.

7. The antenna device according to claim 6, wherein the connection conductor includes a fourth conductive pattern overlapping a portion of the wiring pattern disposed on the circuit substrate of the wiring pattern such that the fourth conductive pattern and the portion of the wiring pattern are isolated from each other, and connecting the planar first conductive pattern and the planar second conductive pattern.

8. The antenna device according to claim 6, wherein the feed circuit is provided on the circuit substrate.

9. The antenna device according to claim 6, wherein each of the planar first conductive pattern and the planar second conductive pattern is a ground conductor.

10. An antenna device comprising:
a circuit substrate;
a feed circuit;
a coil antenna mounted on the circuit substrate;
a wiring pattern disposed on the circuit substrate and connecting the coil antenna and the feed circuit;
a planar first conductive pattern disposed on the circuit substrate and located outside a loop current path defined by the coil antenna, the feed circuit, and the wiring pattern when the circuit substrate is seen in plan view;
a planar second conductive pattern disposed on the circuit substrate and located inside the loop current path when the circuit substrate is seen in plan view; and
a connection conductor connecting the planar first conductive pattern and the planar second conductive pattern, and disposed on the circuit substrate; wherein
at least one location of the connection conductor or the wiring pattern includes an interlayer connection conductor; and
each of the planar first conductive pattern and the planar second conductive pattern is a ground conductor.

11. The antenna device according to claim 10, wherein the connection conductor includes a fourth conductive pattern overlapping a portion of the wiring pattern disposed on the circuit substrate of the wiring pattern such that the fourth conductive pattern and the portion of the wiring pattern are isolated from each other, and connecting the planar first conductive pattern and the planar second conductive pattern.

12. The antenna device according to claim 10, wherein the feed circuit is provided on the circuit substrate.

13. An electronic apparatus comprising:
a circuit substrate;
a feed circuit;
a coil antenna mounted on the circuit substrate;
a wiring pattern disposed on the circuit substrate and connecting the coil antenna and the feed circuit;
a planar first conductive pattern disposed on the circuit substrate and located outside a loop current path defined by the coil antenna, the feed circuit, and the wiring pattern when the circuit substrate is seen in plan view;
a planar second conductive pattern disposed on the circuit substrate and located inside the loop current path when the circuit substrate is seen in plan view; and
a connection conductor connecting the planar first conductive pattern and the planar second conductive pattern and disposed on the circuit substrate; wherein
at least one location of the connection conductor or the wiring pattern includes an interlayer connection conductor; and
the coil antenna includes a first coil opening adjacent to an outer edge of the planar first conductive pattern and a second coil opening located inside the outer edge of the planar first conductive pattern.

14. The electronic apparatus according to claim 13, wherein the connection conductor includes a planar third conductive pattern disposed on the circuit substrate so as to overlap the coil antenna when the connection conductor is seen in plan view, and connecting the planar first conductive pattern and the planar second conductive pattern.

15. The electronic apparatus according to claim 13, wherein the connection conductor includes a fourth conductive pattern overlapping a portion of the wiring pattern disposed on the circuit substrate of the wiring pattern such that the fourth conductive pattern and the portion of the wiring pattern are isolated from each other, and connecting the planar first conductive pattern and the planar second conductive pattern.

16. The electronic apparatus according to claim 13, wherein the feed circuit is provided on the circuit substrate.

17. The electronic apparatus according to claim 13, wherein each of the planar first conductive pattern and the planar second conductive pattern is a ground conductor.

18. An electronic apparatus comprising:
a circuit substrate;
a feed circuit;
a coil antenna mounted on the circuit substrate;
a wiring pattern disposed on the circuit substrate and connecting the coil antenna and the feed circuit;
a planar first conductive pattern disposed on the circuit substrate and located outside a loop current path defined by the coil antenna, the feed circuit, and the wiring pattern when the circuit substrate is seen in plan view;
a planar second conductive pattern disposed on the circuit substrate and located inside the loop current path when the circuit substrate is seen in plan view; and
a connection conductor connecting the planar first conductive pattern and the planar second conductive pattern and disposed on the circuit substrate; wherein at least one location of the connection conductor or the wiring pattern includes an interlayer connection conductor; and the connection conductor includes a planar third conductive pattern disposed on the circuit substrate so as to overlap the coil antenna when the connection conductor is seen in plan view, and connecting the planar first conductive pattern and the planar second conductive pattern.

19. The electronic apparatus according to claim 18, wherein the feed circuit is provided on the circuit substrate.

20. An electronic apparatus comprising:
a circuit substrate;
a feed circuit;
a coil antenna mounted on the circuit substrate;
a wiring pattern disposed on the circuit substrate and connecting the coil antenna and the feed circuit;
a planar first conductive pattern disposed on the circuit substrate and located outside a loop current path defined by the coil antenna, the feed circuit, and the wiring pattern when the circuit substrate is seen in plan view;
a planar second conductive pattern disposed on the circuit substrate and located inside the loop current path when the circuit substrate is seen in plan view; and
a connection conductor connecting the planar first conductive pattern and the planar second conductive pattern and disposed on the circuit substrate; wherein
at least one location of the connection conductor or the wiring pattern includes an interlayer connection conductor; and
each of the planar first conductive pattern and the planar second conductive pattern is a ground conductor.

* * * * *